US008308556B2

(12) United States Patent
Thomas

(10) Patent No.: US 8,308,556 B2
(45) Date of Patent: Nov. 13, 2012

(54) NORMALIZING SKILL-BASED WAGERING GAMES

(75) Inventor: Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/128,662

(22) PCT Filed: Nov. 13, 2009

(86) PCT No.: PCT/US2009/064485

§ 371 (c)(1), (2), (4) Date: May 11, 2011

(87) PCT Pub. No.: WO2010/057061

PCT Pub. Date: May 20, 2010

(65) Prior Publication Data

US 2011/0218035 A1 Sep. 8, 2011

Related U.S. Application Data

(60) Provisional application No. 61/114,854, filed on Nov. 14, 2008.

(51) Int. Cl.
*A63F 9/24* (2006.01)
*G06F 17/00* (2006.01)

(52) U.S. Cl. ................ 463/25; 463/17; 463/20; 463/31; 700/94; 345/474

(58) Field of Classification Search ........................ None
See application file for complete search history.

(56) References Cited

U.S. PATENT DOCUMENTS

| | | | | |
|---|---|---|---|---|
| 6,217,448 | B1 * | 4/2001 | Olsen | 463/25 |
| 6,293,866 | B1 | 9/2001 | Walker et al. | |
| 7,096,079 | B2 * | 8/2006 | Matsuura et al. | 700/94 |
| 7,528,835 | B2 * | 5/2009 | Templeman | 345/474 |
| 8,012,023 | B2 * | 9/2011 | Gates et al. | 463/40 |
| 2001/0051541 | A1 * | 12/2001 | Matsuura et al. | 463/31 |
| 2003/0207708 | A1 * | 11/2003 | Sadri et al. | 463/17 |
| 2005/0159214 | A1 * | 7/2005 | Rohde et al. | 463/29 |
| 2008/0254893 | A1 | 10/2008 | Patel et al. | |

FOREIGN PATENT DOCUMENTS

| | | |
|---|---|---|
| JP | 20057017 | 1/2005 |
| JP | 2007144226 | 6/2007 |
| WO | WO2006135608 | 12/2006 |
| WO | WO 2006135608 A2 * | 12/2006 |
| WO | WO2010057061 | 5/2010 |

OTHER PUBLICATIONS

"PCT Application No. PCT/US09/64485 International Preliminary Report on Patentability", Mar. 15, 2011 , 12 pages.

"PCT Application No. PCT/US09/64485 International Search Report", Feb. 3, 2010 , 7 pages.

* cited by examiner

*Primary Examiner* — Paul A D'Agostino

(74) *Attorney, Agent, or Firm* — DeLizio Gilliam, PLLC

(57) ABSTRACT

In some embodiments, a method comprises initiating a plurality of skill-based bonus games across a plurality of wagering game machines; collecting game result data associated with the plurality of skill-based bonus games; during a normalization process for one of the plurality of skill-based bonus games, determining a rate of awarding a secondary economy asset for the skillbased bonus game is not within a range based on the game result data; adjusting parameters of the skill-based bonus game to normalize the rate of awarding the secondary economy asset across the plurality of skill-based bonus games; and deploying the skill-based bonus game with the adjusted parameters across one or more of the wagering game machines.

25 Claims, 7 Drawing Sheets

NORMALIZING SKILL-BASED WAGERING GAMES

RELATED APPLICATIONS

This application claims the priority benefit of U.S. Provisional Application Ser. No. 61/114,854 filed Nov. 14, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to skill-based bonus games in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises initiating a plurality of skill-based bonus games across a plurality of wagering game machines; collecting game result data associated with the plurality of skill-based bonus games; during a normalization process for one of the plurality of skill-based bonus games, determining a rate of awarding a secondary economy asset for the skill-based bonus game is not within a range based on the game result data; adjusting parameters of the skill-based bonus game to normalize the rate of awarding the secondary economy asset across the plurality of skill-based bonus games; and deploying the skill-based bonus game with the adjusted parameters across one or more of the wagering game machines.

In some embodiments, the method further comprises determining whether to initiate a normalization process for the plurality of skill-based bonus games based on whether a predetermined amount of game result data has been collected for the plurality of skill-based bonus games; if the predetermined amount of game result data has been collected for one or more of the plurality of skill-based bonus games, initiating the normalization process for the one or more of the plurality of skill-based bonus games.

In some embodiments, for each of the plurality of skill-based bonus games, said determining whether to initiate a normalization process comprises: determining whether the skill-based bonus game has been played a predetermined number of times across the plurality of wagering game machines based on the collected game result data associated with the skill-based bonus game; if the skill-based bonus game has been played the predetermined number of times, initiating the normalization process for the skill-based bonus game; if the skill-based bonus game has not been played the predetermined number of times, collecting additional game result data associated with the skill-based bonus game before initiating the normalization process.

In some embodiments, the method further comprises: during a normalization process for one of the plurality of skill-based bonus games, determining whether a rate of awarding each of a plurality of secondary economy assets for the skill-based bonus game is within a corresponding range based on the collected game result data; if the rate of awarding each of the plurality of secondary economy assets for the skill-based bonus game is not within the corresponding range, adjusting parameters of the skill-based bonus game to normalize the rate of awarding each of the plurality of secondary economy assets across the plurality of skill-based bonus games; deploying the skill-based bonus game with the adjusted parameters across one or more of the wagering game machines.

In some embodiments, said determining whether the rate of awarding each of the plurality of secondary economy assets for the skill-based bonus game is within a corresponding range comprises: determining whether the rate of awarding a first secondary economy asset for the skill-based bonus game is within a first range, determining whether the rate of awarding a second secondary economy asset for the skill-based bonus game is within a second range, and determining whether the rate of awarding a third secondary economy asset for the skill-based bonus game is within a third range.

In some embodiments, said adjusting parameters of the skill-based bonus game comprises adjusting parameters of the skill-based bonus game to increase or decrease a difficulty associated with the skill-based bonus game to normalize the rate of awarding the secondary economy asset across the plurality of skill-based bonus games such that the rate of awarding the secondary economy asset is within the range.

In some embodiments, said adjusting parameters of the skill-based bonus game and deploying the skill-based bonus game comprises dynamically adjusting parameters of the skill-based bonus game to normalize the awarding of the secondary economy assets across the plurality of skill-based bonus games and dynamically deploying the skill-based bonus game with the adjusted parameters across one or more of the wagering game machines.

In some embodiments, a wagering game server comprises a bonus game controller configured to initiate a plurality of skill-based bonus games across a plurality of wagering game machines; and a skill-based bonus game normalization unit configured to collect game result data associated with the plurality of skill-based bonus games, and to determine, during a normalization process for one or more of the plurality of skill-based bonus games, whether a rate of awarding a secondary economy asset for the one or more the skill-based bonus games is within a range based on the game result data. If the rate of awarding the secondary economy asset for the one or more skill-based bonus games is not within the range the skill-based bonus game normalization unit is can adjust parameters of the one or more skill-based bonus games to normalize the rate of awarding the secondary economy asset across the plurality of skill-based bonus games, and deploy the one or more skill-based bonus game with the adjusted parameters across one or more of the wagering game machines.

In some embodiments, the skill-based bonus game normalization unit is further configured to determine whether to initiate a normalization process for the plurality of skill-based bonus games based on whether a predetermined amount of game result data has been collected for the plurality of skill-based bonus games, wherein, if the predetermined amount of game result data has been collected for one or more of the plurality of skill-based bonus games, the skill-based bonus game normalization unit is configured to initiate the normalization process for the one or more of the plurality of skill-based bonus games.

In some embodiments, for each of the plurality of skill-based bonus games, the skill-based bonus game normalization unit is configured to determine whether the skill-based bonus game has been played a predetermined number of times across the plurality of wagering game machines based on the collected game result data associated with the skill-based bonus game, wherein, if the skill-based bonus game has been played the predetermined number of times, the skill-based bonus game normalization unit is configured to initiate the normalization process for the skill-based bonus game, wherein, if the skill-based bonus game has not been played the predetermined number of times, the skill-based bonus game normalization unit is configured to collect additional game result data associated with the skill-based bonus game before initiating the normalization process.

In some embodiments, the wagering game server further comprises a secondary economy unit configured to manage secondary economy assets and award secondary economy assets to players of the skilled-based bonus games based on skill exhibited during game play in accomplishing one or more bonus game objectives.

In some embodiments, during a normalization process for one of the skill-based bonus games, the skill-based bonus game normalization unit is configured to determine whether a rate of awarding each of a plurality of secondary economy assets for the skill-based bonus game is within a corresponding range based on the collected game result data, wherein, if the rate of awarding each of the plurality of secondary economy assets for the skill-based bonus game is not within the corresponding range, the skill-based bonus game normalization unit is configured to adjust parameters of the skill-based bonus game to normalize the rate of awarding each of the plurality of secondary economy assets across the plurality of skill-based bonus games.

In some embodiments, the skill-based bonus game normalization unit is configured to determine whether the rate of awarding a first secondary economy asset for the skill-based bonus game is within a first range, determine whether the rate of awarding a second secondary economy asset for the skill-based bonus game is within a second range, and determine whether the rate of awarding a third secondary economy asset for the skill-based bonus game is within a third range.

In some embodiments, the skill-based bonus game normalization unit is configured to adjust parameters of the one or more skill-based bonus games to increase or decrease a difficulty associated with the one or more skill-based bonus games to normalize the rate of awarding the secondary economy asset across the plurality of skill-based bonus games such that the rate of awarding the secondary economy asset is within the range.

In some embodiments, the skill-based bonus game normalization unit is configured to dynamically adjusting parameters of the one or more skill-based bonus games to normalize the awarding of the secondary economy assets across the plurality of skill-based bonus games and the bonus game controller is configured to dynamically deploy the one or more skill-based bonus games with the adjusted parameters across one or more of the wagering game machines.

In some embodiments, an apparatus comprises: means for initiating a plurality of skill-based bonus games across a plurality of wagering game machines; means for collecting game result data associated with the plurality of skill-based bonus games; means for determining whether to initiate a normalization process for one or more of the plurality of skill-based bonus games; means for determining whether a rate of awarding a secondary economy asset for the one or more skill-based bonus games is within a range based on the game result data; and means for adjusting parameters of the one or more skill-based bonus games to normalize the rate of awarding the secondary economy asset across the plurality of skill-based bonus games; and means for deploying the one or more skill-based bonus games with the adjusted parameters across one or more of the wagering game machines.

In some embodiments, the apparatus further comprises means for managing secondary economy assets and awarding secondary economy assets to players of the skilled-based bonus games based on skill exhibited during game play in accomplishing one or more bonus game objectives.

In some embodiments, a method comprises initiating a plurality of skill-based bonus games across a plurality of wagering game machines; collecting game result data associated with the plurality of skill-based bonus games; during a normalization process for one or more of the plurality of skill-based bonus games, determining whether a rate of awarding a secondary economy asset for the one or more skill-based bonus games is within a first range based on the game result data; if the rate of awarding the secondary economy asset for the one or more skill-based bonus games is not within the first range, determining whether the rate of awarding the secondary economy asset is a predetermined amount outside the first range; if the rate of awarding the secondary economy asset is a predetermined amount outside the first range, adjusting parameters of the plurality of skill-based bonus games to normalize the rate of awarding the secondary economy asset across the plurality of skill-based bonus games to a rate within a second range; creating a new secondary economy asset for the plurality of skill-based bonus games; adjusting parameters of the plurality of skill-based bonus games to normalize a rate of awarding the new secondary economy asset across the plurality of skill-based bonus games at a rate within the first range; and deploying the plurality of skill-based bonus games with the adjusted parameters across one or more of the wagering game machines.

In some embodiments, if the rate of awarding the secondary economy asset is not a predetermined amount outside the first range, the method further comprises adjusting parameters of the one or more skill-based bonus games to normalize the rate of awarding the secondary economy asset across the plurality of skill-based bonus games to a rate within the first range; and deploying the one or more skill-based bonus games with the adjusted parameters across one or more of the wagering game machines.

In some embodiments, said adjusting parameters of the plurality of skill-based bonus games comprises adjusting parameters of the skill-based bonus game to increase or decrease a difficulty associated with the plurality of skill-based bonus games to normalize the rate of awarding the secondary economy asset across the plurality of skill-based bonus games.

In some embodiments, said adjusting parameters of the plurality of skill-based bonus games comprises changing one or more of the speed, the size, the number, the location, and the intelligence of skill-based bonus game elements.

In some embodiments, said adjusting parameters of the plurality of skill-based bonus games and deploying the plurality of skill-based bonus games comprises dynamically adjusting parameters of the plurality of skill-based bonus games to normalize the awarding of secondary economy assets across the plurality of skill-based bonus games and dynamically deploying the plurality of skill-based bonus games with the adjusted parameters across one or more of the wagering game machines.

In some embodiments, one or more machine-readable media having instructions stored thereon, which when executed by a set of one or more processors causes the set of one or more processors to perform operations comprises initiating a plurality of skill-based bonus games across a plurality of wagering game machines; collecting game result data associated with the plurality of skill-based bonus games; during a normalization process for one of the plurality of skill-based bonus games, determining whether a rate of awarding a secondary economy asset for the skill-based bonus game is within a range based on the collected game result data; if the rate of awarding the secondary economy asset for the skill-based bonus game is not within the range, adjusting parameters of the skill-based bonus game to normalize the rate of awarding the secondary economy asset across the plurality of skill-based bonus games; and deploying the skill-based bonus game with the adjusted parameters across one or more of the wagering game machines.

In some embodiments, the program product when executed causes the set of one or more processor units to perform operations that comprise: determining whether to initiate a normalization process for the plurality of skill-based bonus games based on whether a predetermined amount of game result data has been collected for the plurality of skill-based bonus games; if the predetermined amount of game result data has been collected for one or more of the plurality of skill-based bonus games, initiating the normalization process for the one or more of the plurality of skill-based bonus games.

In some embodiments, the program product when executed causes the set of one or more processor units to perform operations that comprise adjusting parameters of the skill-based bonus game to increase or decrease a difficulty associated with the skill-based bonus game to normalize the rate of awarding the secondary economy asset across the plurality of skill-based bonus games such that the rate of awarding the secondary economy asset is within the range.

BRIEF DESCRIPTION OF THE FIGURES

Embodiments of the invention are illustrated in the Figures of the accompanying drawings in which.

DESCRIPTION OF THE EMBODIMENTS

Figure 1:
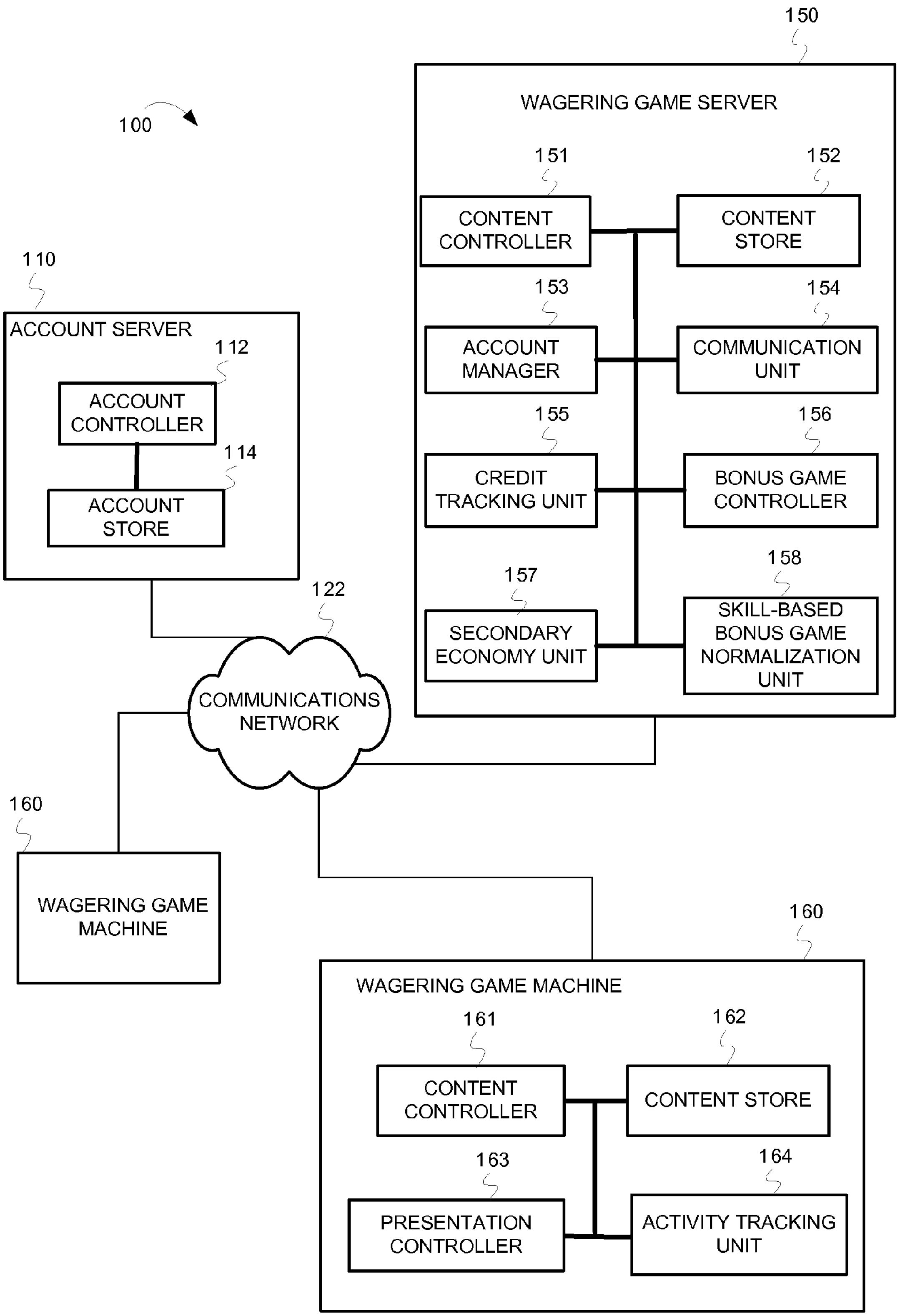
FIG. 1 is a conceptual diagram that illustrates an example of a wagering game system architecture, according to some embodiments.

This description of the embodiments is divided into six sections. The first section provides an introduction to embodiments of the inventive subject matter, while the second section describes example wagering game machine architectures. The third section describes example skill-based bonus games and examples of a secondary economy, the fourth section describes example operations performed by some embodiments and the fifth section describes an example mobile wagering game machine. The sixth section presents some general comments.

Introduction

This section provides an introduction to some embodiments of the inventive subject matter.

Wagering game systems offer players entertainment value and the opportunity to win monetary value. Some wagering game systems attempt to enhance the gaming experience by offering base wagering games that trigger bonus games. In some cases, the bonus games are triggered by one or more events of the base wagering game. For example, in slot wagering games, when certain reel combinations occur (e.g., all cherries), the system may trigger a bonus game. The bonus game may pop up on the same display device as the base game, or on a separate display device (for example, a different screen on the wagering game system). The outcome of the bonus games is often determined by random selection and displayed using spinning wheels or other indicia that reveal monetary or non-monetary awards and other results.

In addition to bonus games that provide players awards based on random selection, wagering game systems can present skill-based bonus games. A skill-based bonus game is a type of game in which a player can utilize physical skill, strategy, knowledge, dexterity, or other types of abilities to manipulate, organize, select, or in any other way control bonus game play elements to accomplish bonus game objectives. In some skill-based bonus games, the higher the skill the player exhibits in accomplishing bonus game objectives during game play, the greater the monetary and/or non-monetary value of the award the wagering game systems provides to the player. For example, in a car racing skill-based bonus game, the wagering game system may reward a player that finishes in first place more credits (or other award types) than a player that finishes in second or third place. In various implementations, the wagering game system rewards players of skill-based bonus games non-monetary secondary economy assets, such as secondary economy credits and/or secondary economy virtual assets, based on the exhibited skill of the player, as will be described further below.

Although the above paragraphs describe some embodiments, the following sections describe many other features and embodiments.

Operating Environment

This section describes example operating environments and networks and presents structural aspects of some embodiments. More specifically, this section includes discussion about wagering game system architectures.

Wagering Game System Architecture

FIG. 1 is a conceptual diagram that illustrates an example of a wagering game system architecture 100, according to some embodiments. As illustrated, the wagering game system architecture 100 includes an account server 110, a wagering game server 150, and a plurality of wagering game machines 160. The account server 110 is configured to control user related accounts accessible via wagering game networks. The account server 110 can store and track player information, such as identifying information (e.g., avatars, screen name, account identification numbers, etc.) or other information like financial account information, social contact information, etc. The account server 110 can also provide auditing capabilities, according to regulatory rules, and track the performance of players, machines, and servers. The account server 110 can include an account controller 112 configured to control information for a player's account. The account server 110 can also include an account store 114 configured to store information for a player's account.

The wagering game system architecture 100 includes a wagering game server 150 configured to control wagering game content and communicate wagering game information, account information, and other information to and from a wagering game machine 160. The wagering game server 150 can include a content controller 151 configured to manage and control content for the presentation of content on the wagering game machine 160. For example, the content controller 151 can generate game results (e.g., win/loss values), including win amounts, for games played on the wagering game machine 160 (e.g., slots, poker, roulette, etc.). The content controller 151 can communicate the game results to the wagering game machine 160. The content controller 151 can also generate random numbers and provide them to the wagering game machine 160 so that the wagering game machine 160 can generate game results. The content controller 151 may also present other types of content, such as advertising, player messages, hotel and casino information, etc. The wagering game server 150 can also include a content store 152 configured to contain content to present on the wagering game machine 160.

The wagering game server 150 may also include an account manager 153 configured to control information related to player accounts. For example, the account manager 153 can communicate wager amounts, game results amounts (e.g., win amounts), bonus game amounts, etc., to the account server 110. The wagering game server 150 can also include a communication unit 154 configured to communicate information to the wagering game machine 160 and to communicate with other systems, devices and networks. The wagering game server 150 can also include a credit tracking unit 155 configured to determine earnable monetary credits winnable during wagering and bonus games. The credit tracking unit 155 can also communicate with account manager 153 to provide information about the monetary credits that were won during the wagering and bonus games.

Furthermore, the wagering game server 150 may include a bonus game controller 156 configured to detect events in the wagering game machine 160 that trigger the presentation of a bonus game to the player, e.g., a skill-based bonus game. The bonus game controller 156 may also initiate and control the presentation of a bonus game on the wagering game machine 160 in response to detecting a trigger event. Alternatively, bonus games can be triggered by events independent of any base wagering game. For example, players can buy into a bonus game in which one or more randomly selected players win progressive jackpots irrespective of any base wagering game. The wagering game server 150 can also include a secondary economy unit 157 configured to store and manage secondary economy assets. The secondary economy unit can also control the awarding of secondary economy assets. Secondary economy assets may include non-monetary awards, such as secondary economy credits, which may be redeemable for various items offered by the casino operator and its business partners. The non-monetary awards can include merchandise, hotel stay credits, etc. The non-monetary awards can also include secondary economy virtual assets, such as, special avatars and graphical trophies that indicate a player's skill, status, and/or accomplishments. The wagering game server 150 can also include a skill-based bonus game normalization unit 158 configured to normalize the frequency of the awarding of scarce secondary economy assets across a plurality of skill-based bonus games.

The wagering game system architecture 100 includes a plurality of wagering game machines 160 configured to present wagering games and receive and transmit information to control and present bonus games. The wagering game machine 160 can include a content controller 161 configured to manage and control content presented on the wagering game machine 160. The wagering game machine 160 can also include a content store 162 configured to store content to present on the wagering game machine 160. The wagering game machine 160 may further include a presentation controller 163 configured to control the presentation of the wagering and bonus game content on the wagering game machine 160. The presentation controller 163 can include audio codecs, video codecs, graphics processing engines, physics engines, and any other devices suitable for presenting audio and video content.

The wagering game machine 160 can also include an activity tracking unit 164 configured to track accomplishment of skill-based goals in skill-based bonus games. The activity tracking unit 164 can also determine that activity triggers, or wagering game events, have occurred, and report the occurrence of triggers and events to the bonus game controller 156 of the wagering game server 150. In some implementations, the activity tracking unit 164 can also work in conjunction with the secondary economy unit 157 of the wagering game server 150 to award and manage secondary economy assets. Although FIG. 1 shows two wagering game machines 160, the wagering game system architecture 100 can include any number of wagering game machines (e.g., banks of stationary wagering game machines and numerous mobile machines in one or more casinos).

Each component shown in the wagering game system architecture 100 is shown as a separate and distinct element connected via a communications network 122. However, some functions performed by one component could be performed by other components. For example, the wagering game server 150 can also be configured to perform functions of the activity tracking unit 163 and/or the account controller 112. Furthermore, the components shown may all be contained in one device, but some, or all, may be included in, or performed by multiple devices, as in the configurations shown in FIG. 1 or other configurations not shown. Furthermore, the wagering game system architecture 100 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Although FIG. 1 describes some embodiments, the following sections describe many other features and embodiments.

Skill-based Bonus Games

This section describes example skill-based bonus games and examples of a secondary economy associated with skill-based bonus games.

Skill-based Bonus Game Examples

Figure 2:
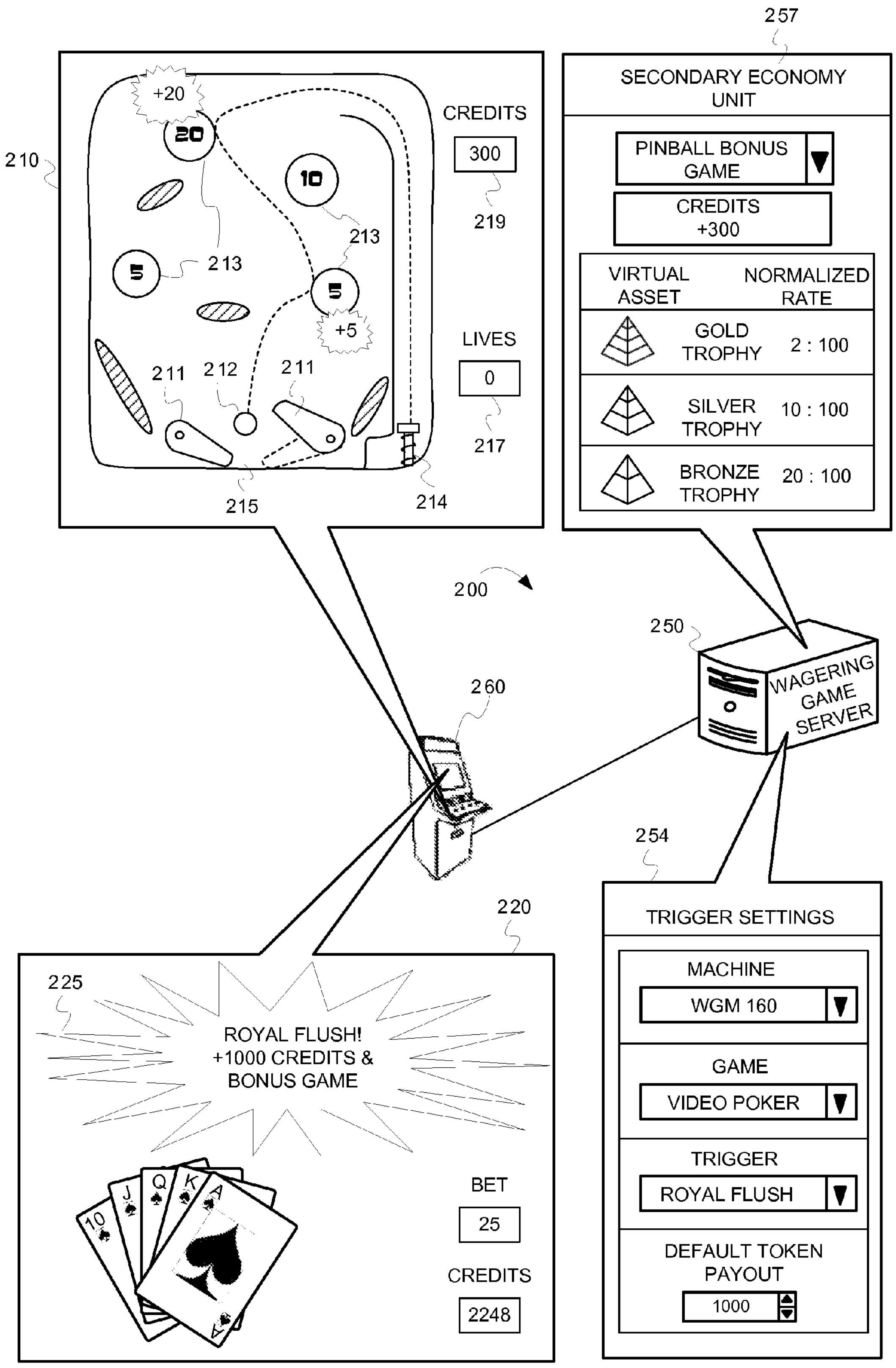
FIG. 2 is a conceptual diagram that illustrates an example of a base wagering game and a skill-based bonus game, according to some embodiments.

FIG. 2 is a conceptual diagram that illustrates an example of a base wagering game and a skill-based bonus game, according to some embodiments. In FIG. 2, a wagering game system ("system") 200 includes a wagering game machine 260 and a wagering game server 250. The wagering game machine 160 presents a video poker base wagering game 220, in which players can win monetary and/or non-monetary awards. For example, players can earn game credits that can be redeemed for money, or for non-monetary items, such as merchandise offered by the casino operator and its business partners. The wagering game server 250 can award game credits or other types of awards based on certain game events and the wagering game machine 260 can present the awards to the player. For instance, in the example illustrated on FIG. 2, in the video poker wagering game 220, if the player's hand turns out to be a royal flush (trigger event), the wagering game server 250 can award +1000 game credits to the player. In one example, the operator of the wagering game server 250 can specify the number of credits (e.g., +1000) that are awarded to players in response to trigger events (e.g., royal flush) within certain wagering game (e.g., video power) via a trigger settings menu 254. For instance, the wagering game server 250 may be configured via the trigger settings menu 254 to award +600 game credits to the player if the player's hand is a full house.

Furthermore, in addition to providing players game credits, the wagering game server 250 can award players a bonus game for the opportunity to win additional monetary and/or non-monetary awards in response to certain game events (e.g., a royal flush or a full house). In one example, the player may be presented with an award indication pop-up 225 specifying that the player has been awarded game credits and a bonus game. In the example illustrated on FIG. 2, in response to the royal flush game event, the wagering game server 250 awards the player a skill-based bonus game (e.g., a pinball bonus game 210). The awarded skill-based bonus game is a type of game in which a player can utilize physical skill, strategy, knowledge, dexterity, or other types of abilities to manipulate, organize, select, or in any other way control bonus game play elements to accomplish bonus game outcomes.

As illustrated in the example of FIG. 2, the skill-based pinball bonus game 210 includes game controller elements (e.g., paddles 211 and ball launcher 214) that a wagering game player can use to physically manipulate one or more wagering game outcome determination elements (e.g., a ball 212). The game controller elements, such as the paddles 211 and the ball launcher 214, are configured to respond directly and immediately to a player's physical manipulation of a game control device (e.g., a button, a keyboard, a joystick, etc.). During the skill-based pinball bonus game 210, the player can manipulate the paddles 211, using physical skill, to accomplish game goals and/or to prevent game penalties. The game penalties can include a method of being penalized by poor skill, such as ball drain 215. The ball drain 215 collects the ball 212 and causes the player to lose a turn, or life, if the player does not keep the ball 212 active within the game using the paddles 211. The game goals can be characterized by game goal elements, such as bumpers 213, which, when hit by the ball 212, will provide the player game credits. The skill-based pinball bonus game 210, lasts for only a specified duration, such as for a limited time period, or for a certain number of lives (e.g., a set number of balls can be launched using the ball launcher 214).

Figure 3:
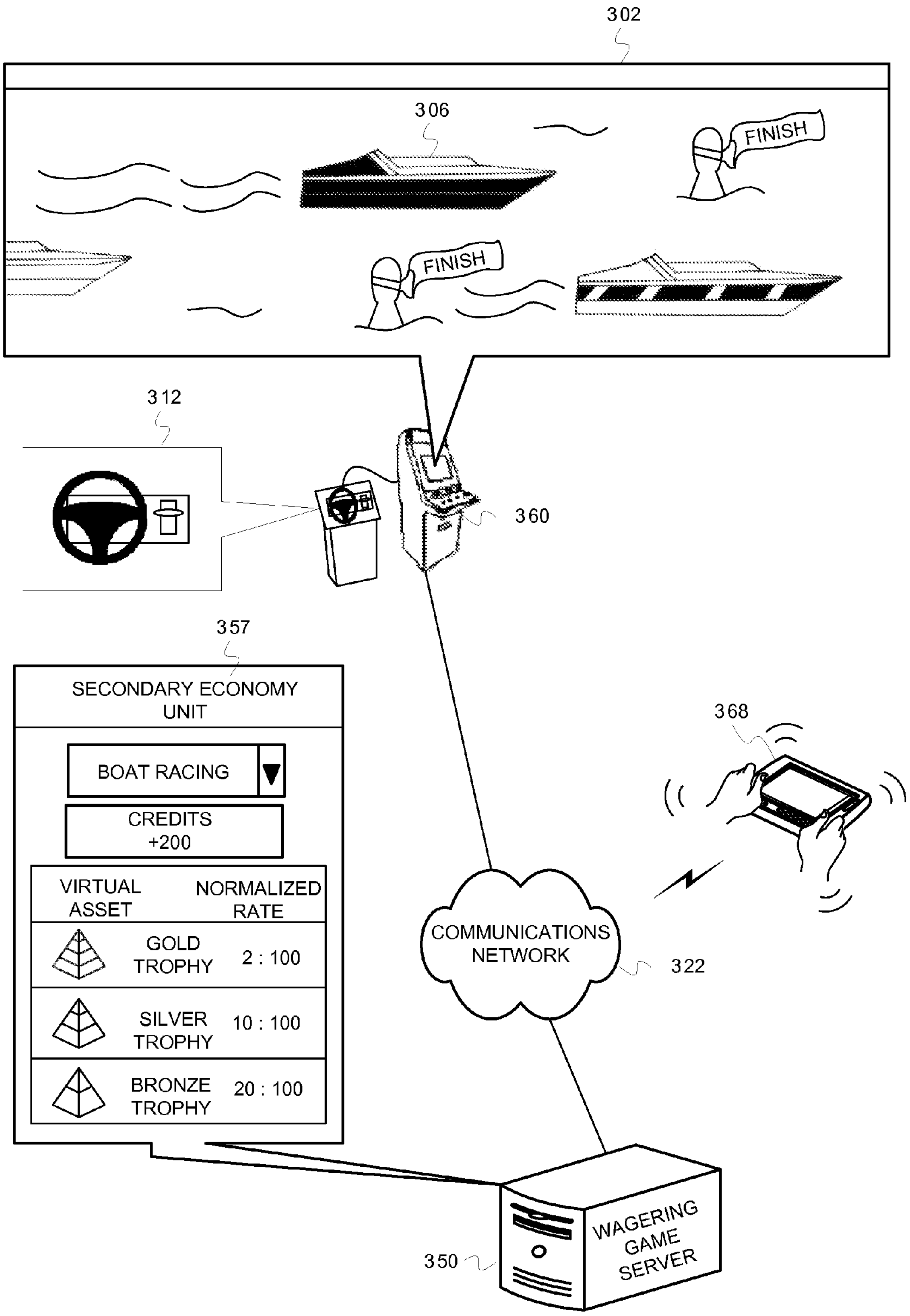
FIG. 3 is a conceptual diagram that illustrates an example of a skill-based bonus game, according to some embodiments.

In some embodiments, the skill-based bonus games can be played independent of the base wagering games. For instance, FIG. 3 illustrated a skill-based boat racing bonus game 302 offered at a wagering game machine 360 in which players can independently buy in for the opportunity to win secondary economy assets. In the skill-based boat racing bonus game 302, players controls racing boats 306 (i.e., the game play elements) according to physical skill, dexterity, etc. using game control devices, such as a dashboard 312 having a steering wheel and accelerator. In some embodiments, players can have the option to play skill-based bonus games via a mobile wagering game machine 368 that connects to the wagering game server 350 via a communications network 322. Furthermore, in some embodiments, multiple players can play the same bonus game. For example, a first player can control a first racing boat via wagering game machine 360 and a second player can control a second racing boat via mobile wagering game machine 368.

Secondary Economy Examples

In various jurisdictions, skill-based bonus games can be governed by various regulations as to the variance in the payout amount of monetary value based on the exhibited skill of the player. For example, some jurisdictions may limit the payout based on skill to only ±2% of the jurisdictional payout floor. Regulations such as these may not allow operators of skill-based bonus games the freedom to reward players of higher skill substantially more monetary value than players of lower skill. A secondary economy can be a means by which operations of skill-based bonus games can reward players non-monetary value that is proportional to the exhibited skill of the player during a skill-based bonus game. In other words, the higher the skill the player exhibits in accomplishing skill-based bonus game objectives during game play, the greater the non-monetary award the system provides to the player. As illustrated in FIG. 1, the secondary economy can be implemented within the secondary economy unit 157 of the wagering game server 150.

Skill-based bonus games provide players an opportunity to win secondary economy assets, such as secondary economy credits and/or secondary economy virtual assets. The secondary economy credits can be redeemable for various items offered by the casino operator and its business partners, e.g., merchandise, hotel stay credits, etc. The secondary economy virtual assets can be special avatars, trophies, or other virtual assets that indicate a player's skill, status, and/or accomplishments. The secondary economy credits and virtual assets that are awarded for each type of skill-based bonus game can be set via the secondary economy unit 157 of the wagering game server 150. For example, for the skill-based pinball bonus game example of FIG. 2, the secondary economy unit 257 specifies that the wagering game server 250 can award both secondary economy credits (e.g., +300) and virtual assets (e.g., bronze, silver, and gold trophies). Similarly, in the skill-based boat racing bonus game example of FIG. 3, the secondary economy unit 357 of the wagering game server 350 specifies the secondary economy assets that can be won by playing the skill-based boat racing bonus game 302.

It is noted that in some implementations the wagering game server 150 may be configured to award players of skill-based bonus games monetary value (e.g., bonus game credits that are added to the total game credits on the base wagering game, in addition to the non-monetary value). For example, the wagering game server 150 can award players of the skill-based bonus games the same amount of monetary value (or within a specified variance amount, e.g., ±2% of the jurisdictional payout floor) regardless of the exhibited skill, and in addition award players non-monetary, secondary economy assets based on the exhibited skill.

In various embodiments, scarcity can be introduced into the secondary economy to add value to the secondary economy assets. For example, the skill-based bonus games can be designed such that it is very difficult to accomplish certain bonus game objectives, and therefore, to win certain secondary economy assets. For instance, the skill-based pinball bonus game 210 of FIG. 2 can be designed such that approximately only 2 out of 100 players (i.e., 2%) can accomplish certain bonus game objectives that earn the player a gold trophy. In some implementations, the secondary economy unit 157 can be configured with a normalized rate for awarding certain scarce secondary economy assets (e.g., a gold trophy) across a plurality of different types of skill-based bonus games. In one example, the normalized awarding rate for scarce secondary economy assets can be determined based on product testing, e.g., R&D testing and/or field testing, and configuring the parameters of the skill-based bonus games. For example, the parameters of a skill-based bonus game can be configured to set the difficulty of accomplishing one or more bonus game objectives at a certain level to limit the number of players that achieve the bonus game objectives. In one example, the speed, size, number, location, and intelligence of bonus game elements can be set to control the difficulty of the skill-based bonus games.

In one implementation, after deployment of the skill-based bonus games, if the awarding rate of a secondary economy asset is outside a set awarding rate range, the wagering game server 150 can dynamically adjust parameters of the skill-based bonus games to re-normalize the awarding rate associated with the secondary economy asset, as will be further described below with reference to FIG. 5. In another embodiment, instead of adjusting the parameters of the skill-based bonus games to re-normalize the awarding rate of the secondary economy asset, a new secondary economy asset can be created for the plurality of skill-based bonus games, as will be described below with reference to FIG. 6.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
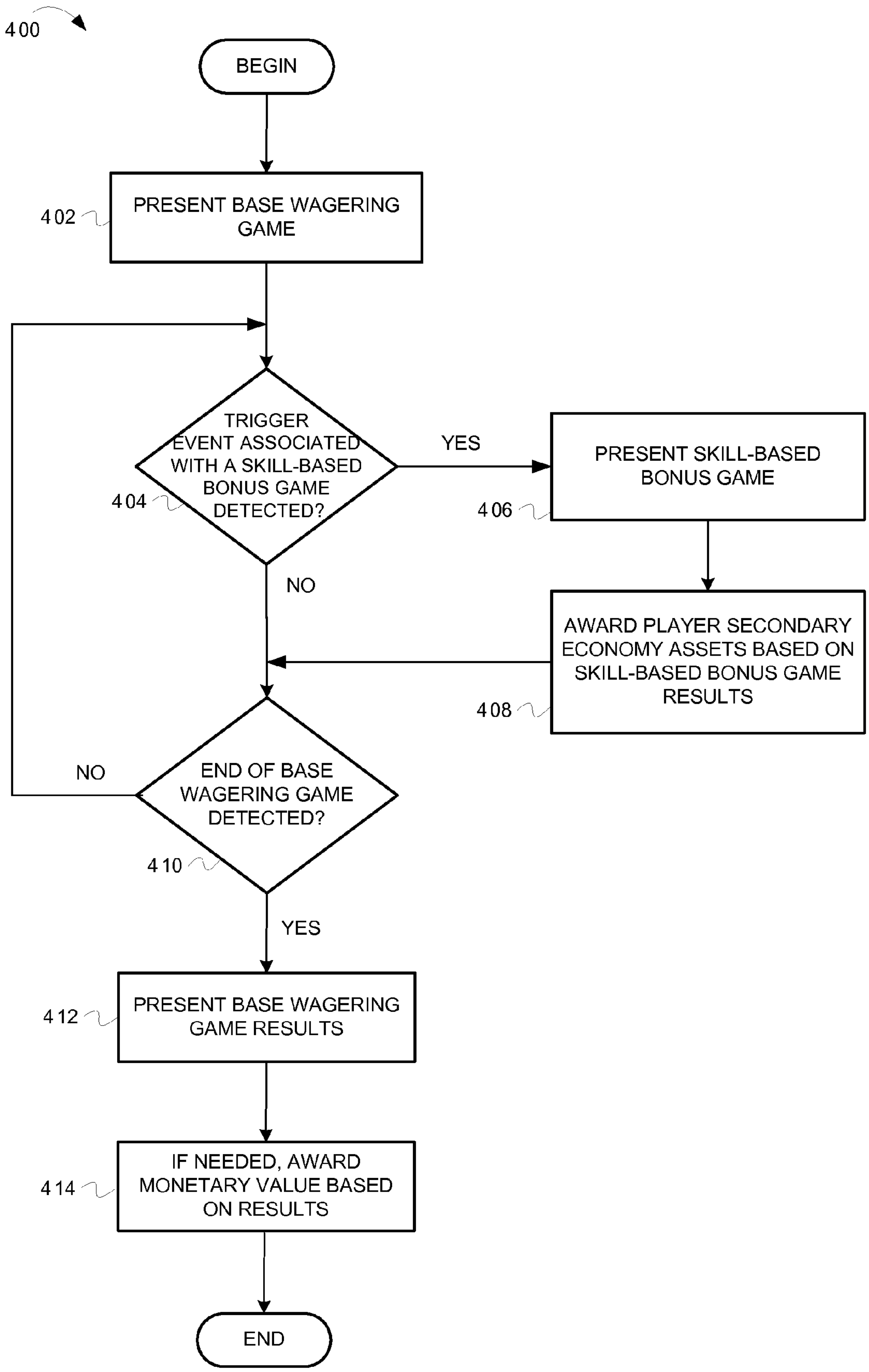
FIG. 4 is a flow diagram illustrating operations for presenting a base wagering game that triggers a skill-based bonus game, according to some embodiments.

FIG. 4 is a flow diagram 400 illustrating operations for presenting a base wagering game that triggers a skill-based bonus game, according to some embodiments. The flow of 400 will be described with reference to the example system architecture of FIG. 1 and the example games of FIG. 2. The flow diagram begins at block 402.

At block 402, the wagering game server 150 presents a base wagering game to a player via the wagering game machine 160. For example, the wagering game server 150 may initiate the presentation of the base wagering game (e.g., video poker 220 shown in FIG. 2) at the wagering game machine 160 in response to the player selecting one of a plurality of base wagering games offered by the wagering game machine 160. The player may then begin to play the base wagering game. After block 402, the flow continues at block 404.

At block 404, the wagering game server 150 determines whether a trigger event associated with a skill-based bonus game has been detected. For example, the bonus game controller 156 of the wagering game server 150 can detect trigger event communications from wagering game machine 160. In one example, the activity tracking unit 164 of the wagering game machine 160 may detect trigger events of the base wagering game and communicate with the wagering game server 150 to provide information regarding the detected trigger event. Trigger events are game events, e.g., game results, which trigger the presentation of a skill-based bonus game. Trigger events can be game events that have a relatively low probability of occurring during game play, and that typically award the player substantially more game credits (or other monetary value) than non-trigger events that have a high probability of occurring during game play. For example, in the video poker wagering game 220, some of the trigger events may be a royal flush, a full house, a straight, etc., and some non-trigger events may be a high card, a two of a kind, etc. It is noted, however, that in some implementations various game events that award players different levels of monetary value may be configured as trigger events whether they have a low, medium, or high probability of occurring during game play. After block 404, if a trigger event is detected, the flow continues at block 406. Otherwise, the flow continues at block 410.

At block 406, if the wagering game server 150 detects a trigger event associated with a skill-based bonus game, the wagering game server 150 presents a skill-based bonus game to the player via the wagering game machine 160. In one example, the bonus game controller 156 of the wagering game server 150 receives the information regarding the detected trigger event from the wagering game machine 160, processes the information, and initiates the skill-based bonus game at the wagering game machine 160. In this example, the bonus game controller 156 may process the trigger event information to determine the type of trigger event (e.g., royal flush trigger event for the video poker wagering game 220) and identify the skill-based bonus game associated with the trigger event (e.g., the pinball bonus game 210). After block 406, the flow continues at block 408.

At block 408, after completion of the skill-based bonus game, the wagering game server 150 awards the player secondary economy assets based on the results of the skill-based bonus game. In one example, the activity tracking unit 164 of the wagering game machine 160 detects the results of the skill-based bonus game and provides the bonus game results to the secondary economy unit 157 of the wagering game server 150. The secondary economy unit 157 determines the type of secondary economy asset(s) to award the player based on the bonus game results, i.e., based on whether the player accomplished certain bonus game objectives. For example, in the skill-based bonus game 210, if the player earns a score from 0-200, the player is awarded +50 secondary economy credits and no virtual assets, if the player earns a score from 201-500, the player is awarded +100 secondary economy credits and a bronze trophy, if a player earns a score from 501-1000, the player is awarded +200 secondary economy credits and a silver trophy, and if the player earns a score of 1000+, the player is awarded +300 secondary economy credits and a gold trophy. In another example, players of the skill-based bonus game may always be awarded the same amount of secondary economy credits (e.g., +300) regardless the performance; however, the virtual assets that are awarded can be dependent on the performance of the player. It is noted that in some embodiments trigger events, e.g., events that correspond to accomplishments of certain bonus game objectives, can be reported to the wagering game server 150 during game play or after completion of the skill-based bonus game, and the wagering game server 150 can award secondary economy assets during or after completion of the skill-based bonus game.

In some embodiments, the secondary economy unit 157 and/or the bonus game controller 156 can provide information regarding the secondary economy assets that were awarded and the skill-based bonus game results to the skill-based bonus game normalization unit 158. If necessary, the skill-based bonus game normalization unit 158 performs operations to normalize the awarding of secondary economy assets across a plurality of skill-based bonus games, as will be described further below with reference to FIGS. 5-6. After block 408, the flow continues at block 410.

At block 410, the wagering game server 150 determines whether the end of the base wagering game has been detected. For example, the content controller 151 of the wagering game server 150 can detect end of game communications from the wagering game machine 160. After block 410, if the end of the base wagering game has been detected, the flow continues at block 412. Otherwise, the flow loops back to block 404.

At block 412, the wagering game server 150 presents the results of the base wagering game. In some implementations, the wagering game server 150 can present both the results of the base wagering game and the results of the skill-based bonus game(s), if any, via the wagering game machine 160 after completion of the base wagering game. After block 412, the flow continues at block 414.

At block 414, if necessary, the wagering game server 150 awards monetary value to the player based on the results of the base wagering game. After block 414, the flow ends.

Figure 5:
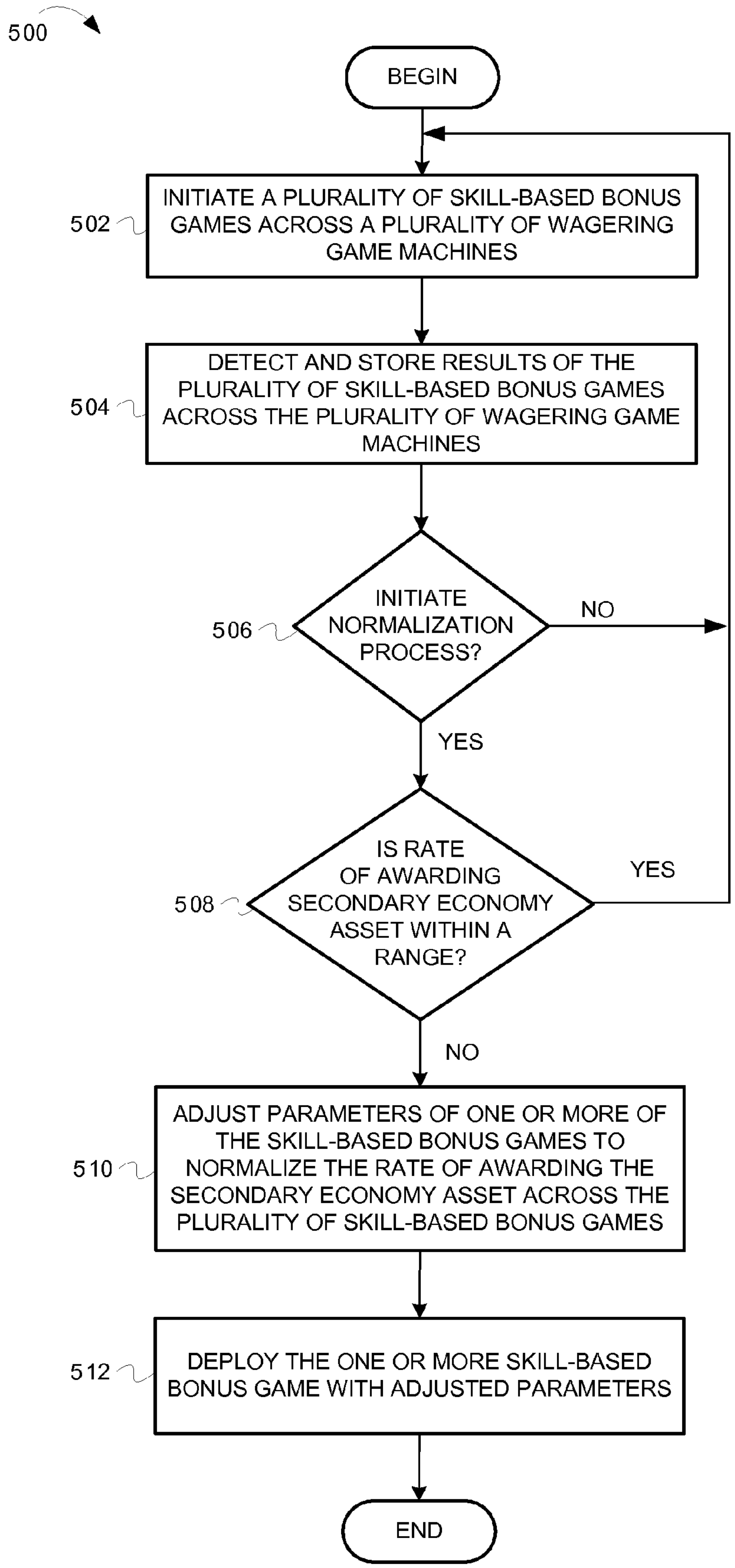
FIG. 5 is a flow diagram illustrating operations for normalizing the awarding of secondary economy assets across a plurality of skill-based bonus games, according to some embodiments.

FIG. 5 is a flow diagram 500 illustrating operations for normalizing the awarding of secondary economy assets across a plurality of skill-based bonus games, according to some embodiments. The flow of 500 will be described with reference to the example system architecture of FIG. 1 and the example games of FIGS. 2-3. The flow diagram begins at block 502.

At block 502, the wagering game server 150 initiates a plurality of skill-based bonus games across a plurality of wagering game machines 160 via communications network 122. For example, the wagering game server 150 can initiate skill-based bonus games such as the pinball bonus game 210 shown in FIG. 2 and the boat racing bonus game 302 shown in FIG. 3. As described above, in some implementations, the bonus game controller 156 of the wagering game server 150 can initiate a skill-based bonus game in response to detecting a trigger event associated with the skill-based bonus game during game play of the corresponding base wagering game. It is noted, however, that in other implementations, the skill-based bonus games can be triggered by events independent of any base wagering game. For example, players can buy into a skill-based bonus game in which one or more randomly selected players win progressive jackpots irrespective of any base wagering game. After block 502, the flow continues at block 504.

At block 504, the wagering game server 150 detects and stores the game results of the plurality of skill-based bonus games across the plurality of the wagering game machines 160. For example, the wagering game server 150 collects information about the number of times each skill-based bonus game is played and the secondary economy asset that was awarded during or after completion of the skill-based bonus game. In one example, the wagering game server 150 stores the game results of the plurality of skill-based bonus games in the skill-based bonus game normalization unit 158. The skill-based bonus game normalization unit 158 can use the game result data to determine awarding rate statistics indicating how often a secondary economy asset is being awarded to skill-based bonus game players, as will be described further below. After block 504, the flow continues at block 506.

At block 506, the wagering game server 150 determines whether to initiate a normalization process for one or more of the plurality of skill-based bonus games implemented across the plurality of wagering game machines 160. Before initiating the normalization process, the skill-based bonus game normalization unit 158 of the wagering game server 150 determines whether sufficient amount of game result data has been collected for analysis purposes. In one implementation, for each skill-based bonus game, the skill-based bonus game normalization unit 158 determines whether the skill-based bonus game has been played a predetermined number of times. If the skill-based bonus game has been played a predetermined number of times, the skill-based bonus game normalization unit 158 initiates the normalization process for the skill-based bonus game, since it has collected sufficient amount of game result data for analysis purposes. In one example, the predetermined number of times may be 100 times. It is noted, however, that the predetermined number of times can be programmable, and therefore may be set to other values, e.g., 1000 times. It is noted, however, that in other implementations the skill-based bonus game normalization unit 158 can determine whether to initiate the normalization process based on other criteria. For example, in another implementation, the skill-based bonus game normalization unit 158 determines whether a predetermined amount of time has elapsed since the previous normalization process for the plurality of the skill-based bonus games. If a predetermined amount of time has elapsed, the skill-based bonus game normalization unit 158 initiates the normalization process for the plurality of the skill-based bonus games. In this implementation, the normalization process can be initiated at approximately the same time for the plurality of the skill-based bonus games. In one example, the predetermined amount of time is 8 hours. It is noted, however, that the predetermined amount of time can be programmable, and therefore may be set to other values, e.g., 24 hours. After block 506, if the wagering game server 150 determines to initiate the normalization process, the flow continues at block 508. Otherwise, the flow loops back to block 502.

At block 508, the wagering game server 150 determines whether the rate of awarding a secondary economy asset is within a range for each of the skill-based bonus games for which the normalization process was initiated. In one example, the skill-based bonus game normalization unit 158 analyses the game results data collected from each of the skill-based bonus games for which the normalization process was initiated to determine whether the rate of awarding a secondary economy asset was within a range for each of the skill-based bonus games. In this example, during the normalization process, the skill-based bonus game normalization unit 158 repeats this step for each of the secondary economy assets that are awarded by the skill-based bonus games. In other words, the skill-based bonus game normalization unit 158 determines whether the rate of awarding each of the secondary economy assets associated with the skill-based bonus games was within a range. The skill-based bonus game normalization unit 158 can set the range associated with the awarding rate for a secondary economy asset to control the scarcity of the secondary economy asset. For example, in the pinball bonus game example of FIG. 2, the awarding rate range for the gold trophy virtual asset can be a range of 1.5%-2.5%. The awarding rate range can be a range centered around the desired awarding rate, e.g., 2% or 2 out of 100 bonus game plays. In another example, the awarding rate range for the silver trophy virtual asset can be a range of 8%-12%, which is a range centered around the desired awarding rate of 10% or 10 out of 100 bonus game plays. The skill-based bonus games that award the secondary economy asset can be designed (after sufficient testing, e.g., R&D testing and/or field testing) such that the secondary economy asset will likely be awarded at a rate within the awarding rate range. After block 508, if the wagering game server 150 determines that the awarding rate is not within the awarding rate range, the flow continues at block 510. Otherwise, the flow loops back to block 502.

At block 510, if the wagering game server 150 determines that the awarding rate for one or more of the skill-based bonus games is not within the awarding rate range, the wagering game server 150 adjusts the parameters of the one or more skill-based bonus games that had an awarding rate outside the awarding rate range to normalize the awarding rate of the secondary economy asset across the plurality of skill-based bonus games. In one example, the skill-based bonus game normalization unit 158 of the wagering game server 150 adjusts the parameters of the one or more skill-based bonus games to normalize the awarding of the secondary economy asset across the plurality of skill-based bonus games to an awarding rate within the awarding rate range. For instance, in the pinball bonus game example of FIG. 2, the skill-based bonus game normalization unit 158 can normalize the awarding of the gold trophy virtual asset across a plurality of skill-based bonus games to an awarding rate within the awarding rate range of 1.5%-2.5%. In various examples, for each of the skill-based bonus games, the skill-based bonus game normalization unit 158 can adjust parameters that control the physics or other characteristics of the skill-based bonus game (e.g., intelligence, availability, or responsiveness of game elements) to increase or decrease the difficulty of the game to normalize the awarding rate of a secondary economy asset across the plurality of skill-based bonus games. For example, in the pinball bonus game example of FIG. 2, to decrease the awarding rate of the gold trophy virtual asset the speed of the ball 212 and/or the number of bumpers 213 can be increased to increase the difficulty of the pinball bonus game. After block 510, the flow continues at block 512.

At block 512, the wagering game server 150 deploys the one or more skill-based bonus games with the adjusted parameters to normalize the awarding of the secondary economy asset across the plurality of skill-based bonus games. In some implementations, the wagering game server 150 can dynamically adjust the parameters of the one or more skill-based bonus games and deploy the bonus games across the wagering game machines 160. In other implementations, the operator of the wagering game server 150 and wagering game machines 160 can manually adjust (e.g., via a graphical user interface) the parameters of the one or more skill-based bonus games and deploy the bonus games across the wagering game machines 160. After block 512, the flow ends.

Figure 6:
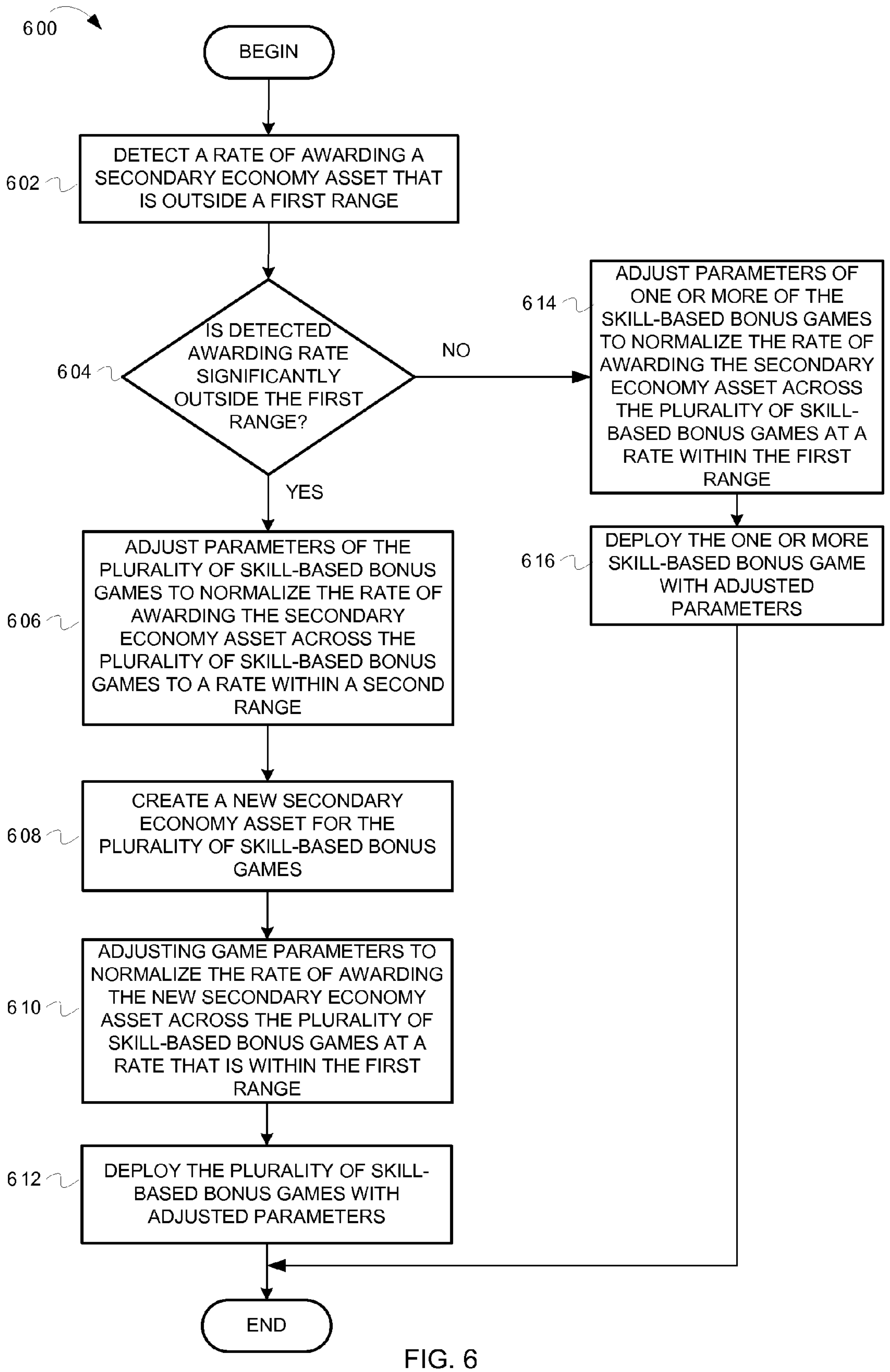
FIG. 6 is a flow diagram illustrating operations for normalizing the awarding of secondary economy assets across a plurality of skill-based bonus games, according to some embodiments.

FIG. 6 is a flow diagram 600 illustrating operations for normalizing the awarding of secondary economy assets across a plurality of skill-based bonus games, according to some embodiments. The flow of 600 will be described with reference to the example system architecture of FIG. 1, the example games of FIG. 2, and the example flow diagram of FIG. 5. The flow diagram begins at block 602.

At block 602, the wagering game server 150 detects a rate of awarding a secondary economy asset for one or more of the plurality of skill-based bonus games that is outside a first range, e.g., after performing the operations described in blocks 502-508 shown in the flow diagram of FIG. 5. For instance, in the example of FIG. 2, the wagering game server 150 detects that the rate of awarding the silver trophy is outside the awarding rate range of 8%-12%. After block 602, the flow continues at block 604.

At block 604, the wagering game server 150 determines whether the detected rate of awarding the secondary economy asset is significantly outside the first range. In one implementation, the wagering game server 150 determines whether the awarding rate of the secondary economy asset is greater than a predetermined percentage amount outside the first range. For instance, in the example of FIG. 2, the wagering game server 150 determines whether the awarding rate of the silver trophy is greater than 2% outside the first range, i.e., if the awarding rate is less than 6% or greater than 14%. After block 604, if the wagering game server 150 determines that the detected awarding rate is significantly outside the first range, the flow continues at block 606. Otherwise, the flow continues to block 614.

At block 606, if the wagering game server 150 determines that the rate of awarding the secondary economy asset is significantly outside the first range, the wagering game server 150 adjusts the parameters of the plurality of skill-based bonus games to normalize the rate of awarding the secondary economy asset across the plurality of skill-based bonus games to a rate that is within a second range. In one example, the second range is a range that is centered around the detected awarding rate that was significantly outside the first range. For instance, in the example described above in the description of block 604, if the detected awarding rate was 20%, the second range can be a range of 18%-22%. In some cases, the awarding rate range associated with the secondary economy asset can be changed to the second range so that the difficulty level of winning the secondary economy asset is not significantly changed after the normalization process. Otherwise, in some examples, players that were used to winning the secondary economy asset may notice the change in the difficulty level of obtaining the secondary economy asset. After block 606, the flow continues at block 608.

At block 608, the wagering game server 150 creates a new secondary economy asset for the plurality of skill-based bonus games. For instance, in the example of FIG. 2, the wagering game server 150 can create a green trophy. After block 608, the flow continues at block 610.

At block 610, the wagering game server 150 adjusts the parameters of the plurality of skill-based bonus games to normalize the rate of awarding the new secondary economy asset across the plurality of skill-based bonus games at a rate that is within the first range. When the detected awarding rate is significantly outside the first range, rather than normalize the secondary economy asset (e.g., the silver trophy) to the first range, the secondary economy asset can be normalized to a second range, and a new secondary economy asset (e.g., the green trophy) can be created, which is then normalized to the first range. After block 610, the flow continues at block 612.

At block 612, the wagering game server 150 deploys the plurality of skill-based bonus games with the adjusted parameters across one or more of the plurality of wagering game terminals 160. After block 612, the flow ends.

At block 614, if the detected awarding rate is not significantly outside the first range, the wagering game server 150 adjusts the parameters of the one or more skill-based bonus games to normalize the awarding rate of the secondary economy asset across the plurality of skill-based bonus games to a rate within the first range, e.g., similar to block 510 of FIG. 5. After block 614, the flow continues at block 616.

At block 616, the wagering game server 150 deploys the one or more skill-based bonus games with the adjusted parameters across one or more of the wagering game machines 160. After block 616, the flow ends.

It is noted that various other techniques can be implemented to normalize the rate of awarding a secondary economy asset across a plurality of skill-based bonus games. As described above, by controlling the awarding rate of secondary economy assets, the perceived value of the secondary economy assets can be managed based on the scarcity. In one implementation, two secondary economy assets can be combined to form a new secondary economy asset with a higher scarcity value and therefore a higher perceived value. In one example, players with the two secondary economy assets in their inventory can be offered the new secondary economy asset. In another example, players with secondary economy assets can trade with other players based on the perceived value of the assets in the secondary economy.

Example Mobile Wagering Game Machine

Figure 7:
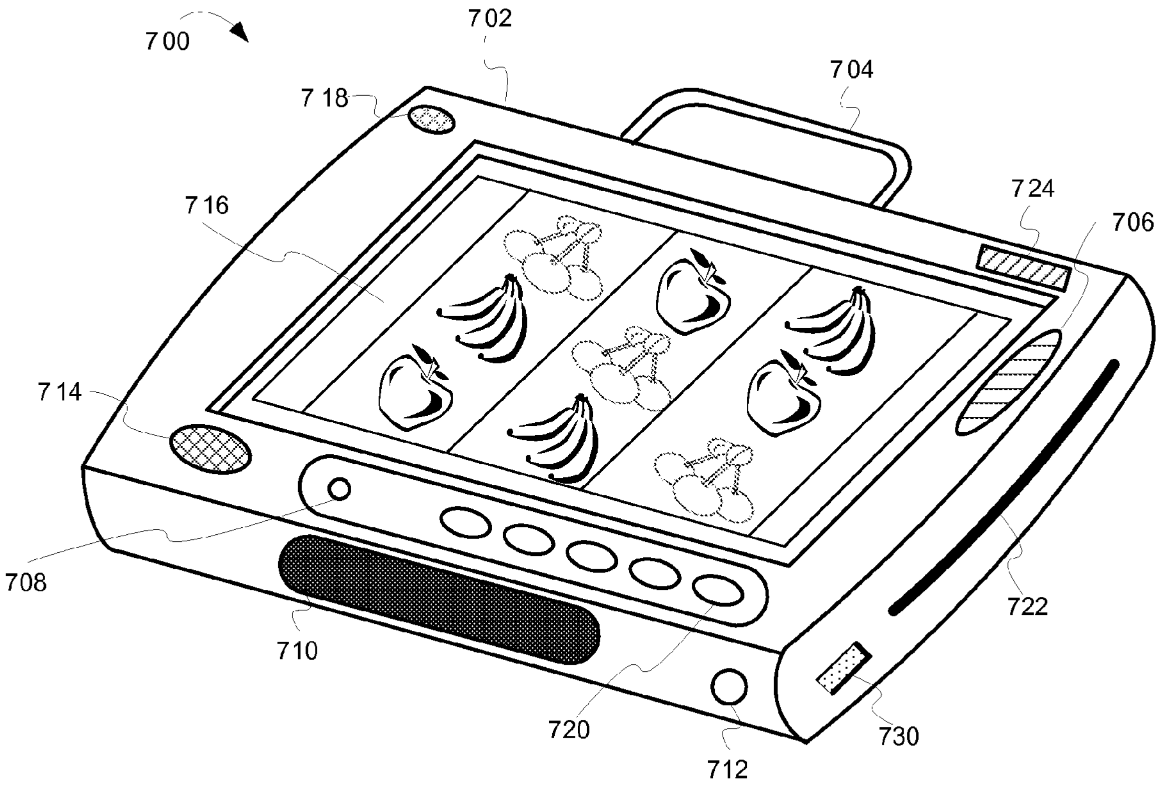
FIG. 7 is a conceptual diagram that illustrates an example of a mobile wagering game machine, according to some embodiments.

FIG. 7 is a conceptual diagram that illustrates an example of a mobile wagering game machine 700, according to some embodiments. In FIG. 7, the mobile wagering game machine 700 includes a housing 702 for containing internal hardware and/or software. In some embodiments, the housing has a form factor similar to a tablet PC, while other embodiments have different form factors. For example, the mobile wagering game machine 700 can exhibit smaller form factors, similar to those associated with personal digital assistants. In some embodiments, a handle 704 is attached to the housing 702. Additionally, the housing can store a foldout stand 710, which can hold the mobile wagering game machine 700 upright or semi-upright on a table or other flat surface.

The mobile wagering game machine 700 includes several input/output devices. In particular, the mobile wagering game machine 700 includes buttons 720, audio jack 708, speaker 714, display 716, biometric device 706, wireless transmission devices (e.g., wireless communication units 712 and 724), microphone 718, and card reader 722. Additionally, the mobile wagering game machine can include tilt, orientation, ambient light, or other environmental sensors.

In some embodiments, the mobile wagering game machine 700 uses the biometric device 706 for authenticating players, whereas it uses the display 716 and speakers 714 for presenting wagering game results and other information (e.g., credits, progressive jackpots, etc.). The mobile wagering game machine 700 can also present audio through the audio jack 708 or through a wireless link such as Bluetooth.

In some embodiments, the wireless communication unit 712 can include infrared wireless communications technology for receiving wagering game content while docked in a wager gaming station. The wireless communication unit 724 can include an 802.11G transceiver for connecting to and exchanging information with wireless access points. The wireless communication unit 724 can include a Bluetooth transceiver for exchanging information with other Bluetooth enabled devices.

In some embodiments, the mobile wagering game machine 700 is constructed from damage resistant materials, such as polymer plastics. Portions of the mobile wagering game machine 700 can be constructed from non-porous plastics which exhibit antimicrobial qualities. Also, the mobile wagering game machine 700 can be liquid resistant for easy cleaning and sanitization.

In some embodiments, the mobile wagering game machine 700 can also include an input/output ("I/O") port 730 for connecting directly to another device, such as to a peripheral device, a secondary mobile machine, etc. Furthermore, any component of the mobile wagering game machine 700 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

initiating a plurality of skill-based bonus games across a plurality of wagering game machines;

collecting game result data associated with the plurality of skill-based bonus games;

during a normalization process for one of the plurality of skill-based bonus games, determining a rate of awarding a secondary economy asset for the skill-based bonus game is not within a range based on the game result data;

adjusting parameters of the skill-based bonus game to normalize the rate of awarding the secondary economy asset across the plurality of skill-based bonus games; and deploying the skill-based bonus game with the adjusted parameters across one or more of the wagering game machines.

2. The method of claim 1, further comprising:

determining whether to initiate the normalization process for the plurality of skill-based bonus games based on whether a predetermined amount of game result data has been collected for the plurality of skill-based bonus games;

if the predetermined amount of game result data has been collected for one or more of the plurality of skill-based bonus games, initiating the normalization process for the one or more of the plurality of skill-based bonus games.

3. The method of claim 2, wherein, for each of the plurality of skill-based bonus games, said determining whether to initiate a normalization process comprises:

determining whether the skill-based bonus game has been played a predetermined number of times across the plurality of wagering game machines based on the collected game result data associated with the skill-based bonus game;

if the skill-based bonus game has been played the predetermined number of times, initiating the normalization process for the skill-based bonus game;

if the skill-based bonus game has not been played the predetermined number of times, collecting additional game result data associated with the skill-based bonus game before initiating the normalization process.

4. The method of claim 1, further comprising, during a normalization process for a second skill-based bonus game of the plurality of skill-based bonus games:

determining whether a rate of awarding each of a plurality of secondary economy assets for the second skill-based bonus game is within a corresponding range based on the collected game result data;

if the rate of awarding each of the plurality of secondary economy assets for the second skill-based bonus game is not within the corresponding range, adjusting parameters of the second skill-based bonus game to normalize the rate of awarding each of the plurality of secondary economy assets across the plurality of skill-based bonus games;

deploying the second skill-based bonus game with the adjusted parameters across one or more of the wagering game machines.

5. The method of claim 4, wherein said determining whether the rate of awarding each of the plurality of secondary economy assets for the second skill-based bonus game is within a corresponding range comprises determining whether the rate of awarding a first secondary economy asset for the second skill-based bonus game is within a first range, determining whether the rate of awarding a second secondary economy asset for the second skill-based bonus game is within a second range, and determining whether the rate of awarding a third secondary economy asset for the skill-based bonus game is within a third range.

6. The method of claim 1, wherein said adjusting parameters of the skill-based bonus game comprises adjusting parameters of the skill-based bonus game to increase or decrease a difficulty associated with the skill-based bonus game to normalize the rate of awarding the secondary economy asset across the plurality of skill-based bonus games such that the rate of awarding the secondary economy asset is within the range.

7. The method of claim 1, wherein said adjusting parameters of the skill-based bonus game and deploying the skill-based bonus game comprises dynamically adjusting parameters of the skill-based bonus game to normalize the awarding of the secondary economy asset across the plurality of skill-based bonus games and dynamically deploying the skill-based bonus game with the adjusted parameters across one or more of the wagering game machines.

8. A wagering game server comprising:

a bonus game controller configured to initiate a plurality of skill-based bonus games across a plurality of wagering game machines; and a skill-based bonus game normalization unit configured to collect game result data associated with the plurality of skill-based bonus games, and to determine, during a normalization process for one or more of the plurality of skill-based bonus games, whether a rate of awarding a secondary economy asset for the one or more the skill-based bonus games is within a range based on the game result data;

if the rate of awarding the secondary economy asset for the one or more skill-based bonus games is not within the range, adjust parameters of the one or more skill-based bonus games to normalize the rate of awarding the secondary economy asset across the plurality of skill-based bonus games; and deploy the one or more skill-based bonus game with the adjusted parameters across one or more of the wagering game machines.

9. The wagering game server of claim 8, wherein the skill-based bonus game normalization unit is further configured to determine whether to initiate a normalization process for the plurality of skill-based bonus games based on whether a predetermined amount of game result data has been collected for the plurality of skill-based bonus games, wherein, if the predetermined amount of game result data has been collected for one or more of the plurality of skill-based bonus games, the skill-based bonus game normalization unit is configured to initiate the normalization process for the one or more of the plurality of skill-based bonus games.

10. The wagering game server of claim 9, wherein, for each of the plurality of skill-based bonus games, the skill-based bonus game normalization unit is configured to determine whether the skill-based bonus game has been played a predetermined number of times across the plurality of wagering game machines based on the collected game result data associated with the skill-based bonus game, wherein, if the skill-based bonus game has been played the predetermined number of times, the skill-based bonus game normalization unit is configured to initiate the normalization process for the skill-based bonus game, wherein, if the skill-based bonus game has not been played the predetermined number of times, the skill-based bonus game normalization unit is configured to collect additional game result data associated with the skill-based bonus game before initiating the normalization process.

11. The wagering game server of claim 8, further comprising a secondary economy unit configured to manage secondary economy assets and award the secondary economy asset to players of the skilled-based bonus games based on skill exhibited during game play in accomplishing one or more bonus game objectives.

12. The wagering game server of claim 8, wherein, during a normalization process for a second skill-based bonus game of the plurality of the skill-based bonus games, the skill-based bonus game normalization unit is configured to determine whether a rate of awarding each of a plurality of secondary economy assets for the second skill-based bonus game is within a corresponding range based on the collected game result data, wherein, if the rate of awarding each of the plurality of secondary economy assets for the second skill-based bonus game is not within the corresponding range, the skill-based bonus game normalization unit is configured to adjust parameters of the second skill-based bonus game to normalize the rate of awarding each of the plurality of secondary economy assets across the plurality of skill-based bonus games.

13. The wagering game server of claim 12, wherein the skill-based bonus game normalization unit is configured to determine whether the rate of awarding a first secondary economy asset for the second skill-based bonus game is within a first range, determine whether the rate of awarding a second secondary economy asset for the second skill-based bonus game is within a second range, and determine whether the rate of awarding a third secondary economy asset for the second skill-based bonus game is within a third range.

14. The wagering game server of claim 8, wherein the skill-based bonus game normalization unit is configured to adjust parameters of the one or more skill-based bonus games to increase or decrease a difficulty associated with the one or more skill-based bonus games to normalize the rate of awarding the secondary economy asset across the plurality of skill-based bonus games such that the rate of awarding the secondary economy asset is within the range.

15. The wagering game server of claim 8, wherein the skill-based bonus game normalization unit is configured to dynamically adjusting parameters of the one or more skill-based bonus games to normalize the awarding of the secondary economy assets across the plurality of skill-based bonus games and the bonus game controller is configured to dynamically deploy the one or more skill-based bonus games with the adjusted parameters across one or more of the wagering game machines.

16. A wagering game server including a processor and non-transitory computer-readable storage medium, the wagering game server comprising:

the non-transitory computer-readable storage medium including, means for initiating, by the processor of the wagering game server, a plurality of skill-based bonus games across a plurality of wagering game machines;

means for collecting game result data associated with the plurality of skill-based bonus games;

means for determining whether to initiate a normalization process for one or more of the plurality of skill-based bonus games;

means for determining whether a rate of awarding a secondary economy asset for the one or more skill-based bonus games is within a range based on the game result data;

means for adjusting parameters of the one or more skill-based bonus games to normalize the rate of awarding the secondary economy asset across the plurality of skill-based bonus games; and means for deploying the one or more skill-based bonus games with the adjusted parameters across one or more of the wagering game machines.

17. The wagering game server of claim 16, wherein the non-transitory computer-readable storage medium further includes means for managing secondary economy assets and awarding secondary economy assets to players of the skilled-based bonus games based on skill exhibited during game play in accomplishing one or more bonus game objectives.

18. A computer-implemented method comprising:

initiating a plurality of skill-based bonus games across a plurality of wagering game machines;

collecting game result data associated with the plurality of skill-based bonus games;

during a normalization process for one or more of the plurality of skill-based bonus games, determining whether a rate of awarding a secondary economy asset for the one or more skill-based bonus games is within a first range based on the game result data;

if the rate of awarding the secondary economy asset for the one or more skill-based bonus games is not within the first range, determining whether the rate of awarding the secondary economy asset is a predetermined amount outside the first range;

if the rate of awarding the secondary economy asset is a predetermined amount outside the first range, adjusting parameters of the plurality of skill-based bonus games to normalize the rate of awarding the secondary economy asset across the plurality of skill-based bonus games to a rate within a second range;

creating a new secondary economy asset for the plurality of skill-based bonus games;

adjusting parameters of the plurality of skill-based bonus games to normalize a rate of awarding the new secondary economy asset across the plurality of skill-based bonus games at a rate within the first range; and deploying the plurality of skill-based bonus games with the adjusted parameters across one or more of the wagering game machines.

19. The method of claim 18, wherein, if the rate of awarding the secondary economy asset is not a predetermined amount outside the first range, the method further comprising:

adjusting parameters of the one or more skill-based bonus games to normalize the rate of awarding the secondary economy asset across the plurality of skill-based bonus games to a rate within the first range; and deploying the one or more skill-based bonus games with the adjusted parameters across one or more of the wagering game machines.

20. The method of claim 18, wherein said adjusting parameters of the plurality of skill-based bonus games comprises adjusting parameters of the skill-based bonus game to increase or decrease a difficulty associated with the plurality of skill-based bonus games to normalize the rate of awarding the secondary economy asset across the plurality of skill-based bonus games.

21. The method of claim 20, wherein said adjusting parameters of the plurality of skill-based bonus games comprises changing one or more of the speed, the size, the number, the location, and the intelligence of skill-based bonus game elements.

22. The method of claim 18, wherein said adjusting parameters of the plurality of skill-based bonus games and deploying the plurality of skill-based bonus games comprises dynamically adjusting parameters of the plurality of skill-based bonus games to normalize the awarding of secondary economy assets across the plurality of skill-based bonus games and dynamically deploying the plurality of skill-based bonus games with the adjusted parameters across one or more of the wagering game machines.

23. One or more non-transitory computer-readable storage media, having instructions stored therein, which, when executed by one or more processors causes the one or more processors to perform operations comprise:

initiating a plurality of skill-based bonus games across a plurality of wagering game machines;

collecting game result data associated with the plurality of skill-based bonus games;

during a normalization process for one of the plurality of skill-based bonus games, determining whether a rate of awarding a secondary economy asset for the skill-based bonus game is within a range based on the collected game result data;

if the rate of awarding the secondary economy asset for the skill-based bonus game is not within the range, adjusting parameters of the skill-based bonus game to normalize the rate of awarding the secondary economy asset across the plurality of skill-based bonus games; and deploying the skill-based bonus game with the adjusted parameters across one or more of the wagering game machines.

24. The non-transitory computer-readable storage media of claim 23, wherein the operations further comprise:

determining whether to initiate a normalization process for the plurality of skill-based bonus games based on whether a predetermined amount of game result data has been collected for the plurality of skill-based bonus games;

if the predetermined amount of game result data has been collected for one or more of the plurality of skill-based bonus games, initiating the normalization process for the one or more of the plurality of skill-based bonus games.

25. The non-transitory computer-readable storage media of claim 23, wherein said operation of adjusting parameters of the skill-based bonus game comprises adjusting parameters of the skill-based bonus game to increase or decrease a difficulty associated with the skill-based bonus game to normalize the rate of awarding the secondary economy asset across the plurality of skill-based bonus games such that the rate of awarding the secondary economy asset is within the range.

* * * * *